United States Patent
Liu et al.

(10) Patent No.: US 12,556,330 B2
(45) Date of Patent: Feb. 17, 2026

(54) METHOD AND APPARATUS FOR ACQUIRING UPLINK CHANNEL STATE INFORMATION

(71) Applicant: DATANG MOBILE COMMUNICATIONS EQUIPMENT CO., LTD., Beijing (CN)

(72) Inventors: Zhengxuan Liu, Beijing (CN); Qiubin Gao, Beijing (CN); Hui Li, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 668 days.

(21) Appl. No.: 17/925,315

(22) PCT Filed: Mar. 17, 2021

(86) PCT No.: PCT/CN2021/081354
§ 371 (c)(1),
(2) Date: Nov. 15, 2022

(87) PCT Pub. No.: WO2021/227648
PCT Pub. Date: Nov. 18, 2021

(65) Prior Publication Data
US 2023/0198711 A1 Jun. 22, 2023

(30) Foreign Application Priority Data
May 15, 2020 (CN) .......................... 202010412184.8

(51) Int. Cl.
*H04L 5/00* (2006.01)
*H04B 1/713* (2011.01)
(Continued)

(52) U.S. Cl.
CPC .......... *H04L 5/0051* (2013.01); *H04B 1/713* (2013.01); *H04B 17/309* (2015.01);
(Continued)

(58) Field of Classification Search
CPC ... H04L 5/0051; H04L 5/0064; H04L 5/0048; H04B 1/713; H04B 17/364;
(Continued)

(56) References Cited

U.S. PATENT DOCUMENTS 10,805,140 B2 * 10/2020 Kim .................. H04W 72/0466
10,863,494 B2 * 12/2020 Zhang .................... H04L 5/005
(Continued)

FOREIGN PATENT DOCUMENTS

| CN | 101674655 A | 3/2010 |
|---|---|---|
| CN | 103945541 A | 7/2014 |

(Continued)

OTHER PUBLICATIONS

3GPP TS 38.214 V16.1.0—"3rd Generation Partnership Project—Technical Specification Group Radio Access Network—NR—Physical layer procedures for data", pp. 1-7 and 126-138; Mar. 2020 (Year: 2020).*

*Primary Examiner* — Redentor Pasia
(74) *Attorney, Agent, or Firm* — KILPATRICK TOWNSEND & STOCKTON LLP (57) ABSTRACT

The present disclosure relates to the technical field of communications, and in particular to a method and apparatus for acquiring uplink channel state information, which are used for acquiring a transmission path with a relatively low delay. The method comprises: a network side device generating SRS resource configuration information on the basis of a preset bandwidth parameter, a frequency domain density parameter and a time domain parameter, and receiving at least one SRS returned by a terminal on the basis of the SRS
(Continued)

resource configuration information; and then the network side device measuring, on the basis of the at least one SRS, an uplink channel used by the terminal, and determining corresponding uplink channel state information. In this way, SRS resource configuration information is generated by means of a preset bandwidth parameter and frequency domain density parameter, such that a bandwidth configuration of an SRS resource can be increased, and a frequency domain density of the SRS resource can be reduced, thereby improving a signal to interference plus noise ratio of each SRSRE; and a network side device can capture transmission paths with different time delays, thereby designing a port selection codebook with a higher precision.

13 Claims, 3 Drawing Sheets

(51) Int. Cl.
*H04B 17/309* (2015.01)
*H04B 17/364* (2015.01)
*H04B 17/382* (2015.01)
*H04W 72/542* (2023.01)

(52) U.S. Cl.
CPC ......... *H04B 17/364* (2015.01); *H04B 17/382* (2015.01); *H04L 5/0064* (2013.01); *H04W 72/542* (2023.01)

(58) Field of Classification Search
CPC ............... H04B 17/309; H04B 17/382; H04W 72/0453; H04W 72/542; H04W 72/23
See application file for complete search history.

(56) References Cited

U.S. PATENT DOCUMENTS

| | | | |
|---|---|---|---|
| 2019/0053223 A1 | 2/2019 | Zhou | |
| 2019/0379501 A1 | 12/2019 | Park et al. | |
| 2020/0014515 A1 | 1/2020 | Qin et al. | |
| 2020/0059907 A1* | 2/2020 | Joseph | H04B 1/713 |
| 2020/0329485 A1* | 10/2020 | Tsai | H04W 72/535 |
| 2021/0320771 A1* | 10/2021 | Liu | H04L 5/0048 |
| 2022/0052734 A1* | 2/2022 | Faxer | H04B 7/0478 |
| 2022/0200757 A1* | 6/2022 | Guo | H04L 5/0044 |
| 2023/0217429 A1* | 7/2023 | Faxér | H04L 5/0051 370/329 |

FOREIGN PATENT DOCUMENTS

| | | |
|---|---|---|
| CN | 104079373 A | 10/2014 |
| CN | 108111272 A | 6/2018 |
| CN | 108632008 A | 10/2018 |
| CN | 109391304 A | 2/2019 |
| CN | 109802810 A | 5/2019 |
| CN | 111082907 A | 4/2020 |
| KR | 101460331 B1 | 11/2014 |
| WO | 2019029536 A1 | 2/2019 |

\* cited by examiner

FIG. 1

-- Prior Art --

METHOD AND APPARATUS FOR ACQUIRING UPLINK CHANNEL STATE INFORMATION

CROSS-REFERENCE OF RELATED APPLICATIONS

The present application is a National Stage of International Application No. PCT/CN2021/081354, filed Mar. 17, 2021, which claims the priority from Chinese Patent Application No. 202010412184.8, filed with the China National Intellectual Property Administration on May 15, 2020 and entitled "Method and Apparatus for Obtaining Uplink Channel State Information", which is hereby incorporated by reference in its entirety.

FIELD OF THE DISCLOSURE

The disclosure relates to the field of communication technologies, and in particular, to a method and apparatus for obtaining uplink channel state information.

BACKGROUND

In the 5G New Radio (5G NR) system, for the Type II codebook, the reciprocity of the angle information and delay information of an uplink channel and a downlink channel is used, that is, the angle information of the uplink channel may be used as the angle information of the downlink channel, and the delay information of the uplink channel may be used as the delay information of the downlink channel. The port selection codebook and the enhanced port selection codebook are respectively defined, to assist the network side device to select an appropriate precoding matrix.

In one embodiment, the network side device configures corresponding Sounding Reference Signal (SRS) resources for the terminal, and the terminal sends an SRS to the network side device based on the SRS resource configuration, and the network side device can determine the uplink channel information through the SRS sent by the terminal, and then obtain the angle information and delay information according to uplink channel information, where the angle information is used to characterize the sending angle of the signal, and the delay information is used to characterize the time required by the signal from the sender to the receiver.

Figure 1:
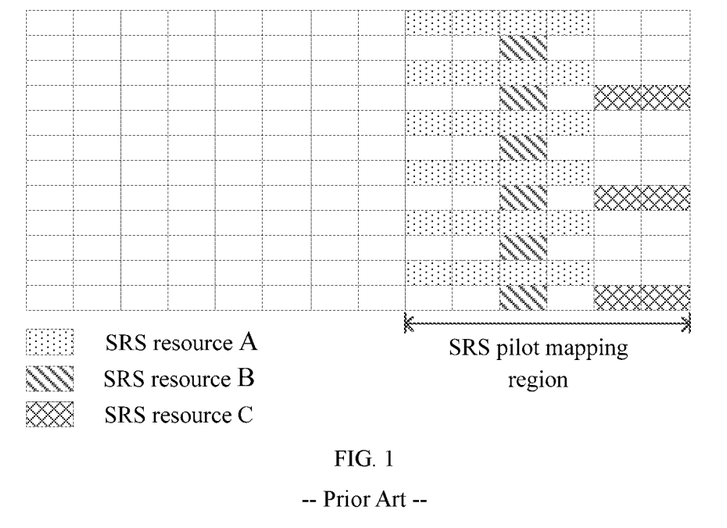
FIG. 1 is a schematic diagram of the frequency domain density of SRS resources in the prior art.

At present, referring to FIG. 1, the SRS resources configured for the terminal on the network side are as follows.

In the time domain, one SRS resource may be sent on N consecutive Orthogonal Frequency Division Multiplexing (OFDM) symbols, where the value of N is 1, 2 or 4. Referring to FIG. 1, the SRS resource A occupies 1 OFDM symbol, the SRS resource B occupies 4 OFDM symbols, and the SRS resource C occupies 2 OFDM symbols.

In the frequency domain, one SRS resource has a comb-like (Comb) structure, that is, one SRS resource is not mapped on consecutive subcarriers. The Comb structure can be represented by the Comb parameter of which the value is 2 or 4, where the value of the Comb parameter being 2 indicates that one SRS resource is mapped at a spacing of one subcarrier, as shown by the SRS resource A and SRS resource B in FIG. 1, and the value of the Comb parameter being 4 indicates that one SRS resource is mapped at a spacing of three subcarriers, as shown by the SRS resource C in FIG. 1.

It is assumed that the delay vector pointing to the $m^{th}$ transmission path on an OFDM symbol modulated and transmitted based on OFDM is expressed as:

$$b_u(\tau_m)=[1,e^{-j2\pi\eta_U\tau_m},\ldots,e^{-j2\pi(N_3^U-1)\eta_U\tau_m}]^T \quad (1)$$

where $\eta_U$ represents the frequency interval of the uplink channel (that is, the interval of subcarriers, Physical Resource Blocks (PRBs) or uplink sub-bands), $\tau_m$ represents the delay of the $m^{th}$ transmission path, $N_3^U$ represents the number of Resource Elements (REs) occupied by the SRS sent on a sub-band or PRB of the uplink channel, and j represents an imaginary number.

After the network side determines the uplink channel information through the SRS sent by the terminal, the delay vector of the $m^{th}$ transmission path of the uplink channel may be represented by a Discrete Fourier Transform (DFT) basis vector in the frequency domain, where the DFT basis vector is:

$$f_m^U = \left[1, e^{-j2\pi\frac{n_m^U}{N_3^U}}, \ldots, e^{-j2\pi\frac{(N_3^U-1)n_m^U}{N_3^U}}\right]^T \quad (2)$$

where $n_m^U$ represents an index in all candidate DFT basis vectors in the frequency domain.

When the formula (2) approaches the formula (1) infinitely, $$\frac{n_m^U}{N_3^U} = \eta_U\tau_m$$

can be known from the formulas (1) and (2). At this time:

$$\tau_m = \frac{n_m^U}{\eta_U N_3^U}. \quad (3)$$

As can be seen from the formula (3), the delay information of the transmission path is related to $\eta_U$ and $N_3^U$. When the value of $\eta_U N_3^U$ is larger, the network side device can capture the transmission path with a smaller delay.

In some embodiments, if the network side device uses the existing SRS resource configuration method to configure the SRS resources for the terminal, the frequency interval of the Comb structure is small, that is, $\eta_U$ is small, so the transmission path with the smaller delay cannot be captured, and thus the more accurate channel delay information cannot be obtained.

In order to capture the transmission path with the smaller delay, the terminal needs to send the SRS on a larger bandwidth, that is, the value of $N_3^U$ is increased, and the terminal needs to send the SRS on more frequency domain resources. However, due to the power limitation of the terminal, it is impossible for the terminal to simultaneously send the SRS on more subcarriers, PRBs or sub-bands when performing the uplink transmission. In particular, for an edge terminal, it is usually necessary to send the SRS on a smaller bandwidth, such as some sub-bands, to increase the uplink coverage.

It can be seen that anew solution needs to be designed to overcome the above-mentioned defects.

BRIEF SUMMARY

The disclosure provides a method and apparatus for obtaining uplink channel state information, to capture transmission paths with different delays, to design a port selection codebook with higher precision.

The embodiments of the disclosure are as follows.

In one embodiments, a method for obtaining uplink channel state information includes:
- determining, by a network side device, SRS resource configuration information based on a preset bandwidth parameter, a preset frequency domain density parameter and a preset time domain parameter, in a case that the network side device determines to obtain the uplink channel state information;
- sending, by the network side device, the SRS resource configuration information to a terminal;
- receiving, by the network side device, at least one SRS reported by the terminal based on the SRS resource configuration information; and
- measuring, by the network side device, an uplink channel used by the terminal based on the at least one SRS, and determining the corresponding uplink channel state information.

In some embodiments, the uplink channel state information includes angle information and/or delay information, where the angle information is used to characterize a signal emission angle and a signal arrival angle, and the delay information is used to characterize the time required for a signal to be sent from the terminal to the network side device.

In some embodiments, the preset bandwidth parameter is determined according to a maximum allowed uplink scheduled Bandwidth Part (BWP) or a maximum allowed downlink scheduled BWP, and the preset frequency domain density parameter is determined according to a frequency domain density of a downlink Channel State Information-Reference Signal (CSI-RS) or a sub-band size of a Precoding Matrix Indicator (PMI), where a value of the preset bandwidth parameter is an integer multiple of 4, and the preset bandwidth parameter is not greater than a maximum value of the downlink scheduled BWP in a case that the value of the preset bandwidth parameter is determined according to the downlink scheduled BWP.

In some embodiments, the determining, by the network side device, the SRS resource configuration information based on the preset bandwidth parameter, the preset frequency domain density parameter and the preset time domain parameter, includes:
- determining, by the network side device, a bandwidth configuration of at least one SRS resource based on the preset bandwidth parameter;
- determining, by the network side device, a frequency domain density of the at least one SRS resource based on the preset frequency domain density parameter;
- determining, by the network side device, a time domain parameter N corresponding to the at least one SRS resource based on a type of a service request or uplink channel quality information of a known terminal;
- determining, by the network side device, the SRS resource configuration information of the at least one SRS resource based on the bandwidth configuration, the frequency domain density and the time domain parameter N;
- when a value of N is greater than 1, the terminal is instructed to send the at least one SRS in a frequency hopping manner on N Orthogonal Frequency Division Multiplexing, OFDM, symbols within one slot or across different slots; when the value of N is equal to 1, the terminal is instructed to send the at least one SRS in the frequency hopping manner across different slots.

In some embodiments, the measuring, by the network side device, the uplink channel used by the terminal based on the at least one SRS, and determining the corresponding uplink channel state information, includes:
- generating, by the network side device, at least one uplink channel information corresponding to the at least one SRS by measuring the uplink channel used by the terminal based on the at least one SRS;
- determining, by the network side device, the corresponding uplink channel state information by:
- determining, by the network side device, X spatial domain basis vectors based on first uplink channel information included in the at least one uplink channel information;
- determining, by the network side device, angle information of the uplink channel based on the X spatial domain basis vectors;
- taking, by the network side device, the X spatial domain basis vectors as beams of a CSI-RS;
- sending, by the network side device, a beam-forming CSI-RS to the terminal through X ports to select L ports from the X ports by the terminal;
- receiving, by the network side device, port indication information indicating the L ports returned by the terminal;
- determining, by the network side device, M frequency domain basis vectors based on the L ports and second uplink channel information included in the at least one uplink channel information; and
- determining, by the network side device, delay information of the uplink channel based on the M frequency domain basis vectors;
- where X, L, and M are preset integers, and the first uplink channel information is same as the second uplink channel information, or the first uplink channel information is different from the second uplink channel information.

In some embodiments, the measuring, by the network side device, the uplink channel used by the terminal based on the at least one SRS, and determining the corresponding uplink channel state information, includes:
- generating, by the network side device, at least one uplink channel information corresponding to the at least one SRS by measuring the uplink channel used by the terminal based on the at least one SRS;
- determining, by the network side device, the corresponding uplink channel state information by following steps:
- determining, by the network side device, a spatial domain basis vector and a frequency domain basis vector based on the at least one uplink channel information; and
- determining, by the network side device, angle information and delay information of the uplink channel based on the spatial domain basis vector and the frequency domain basis vector.

In one embodiment, an apparatus for obtaining uplink channel state information includes:
- a memory configured to store executable instructions;
- a processor configured to read and execute the executable instructions stored in the memory to perform a process of:
- determining SRS resource configuration information based on a preset bandwidth parameter, a preset frequency domain density parameter and a preset time domain parameter, in a case that determining to obtain the uplink channel state information;
- sending the SRS resource configuration information to a terminal;

receiving at least one SRS reported by the terminal based on the SRS resource configuration information; and measuring an uplink channel used by the terminal based on the at least one SRS, and determining the corresponding uplink channel state information.

In some embodiments, the uplink channel state information includes angle information and/or delay information, where the angle information is used to characterize a signal emission angle and a signal arrival angle, and the delay information is used to characterize the time required for a signal to be sent from the terminal to the network side device.

In some embodiments, the preset bandwidth parameter is determined according to a maximum allowed uplink scheduled BWP or a maximum allowed downlink scheduled BWP, and the preset frequency domain density parameter is determined according to a frequency domain density of a downlink CSI-RS or a sub-band size of a PMI, and a value of the preset bandwidth parameter is an integer multiple of 4, and the preset bandwidth parameter is not greater than a maximum value of the downlink scheduled BWP, in a case that the value of the preset bandwidth parameter is determined according to the downlink scheduled BWP.

In some embodiments, when in a case that the SRS resource configuration information is determined based on the preset bandwidth parameter, the preset frequency domain density parameter and the preset time domain parameter, the processor is configured to:

determine a bandwidth configuration of at least one SRS resource based on the preset bandwidth parameter;

determine a frequency domain density of the at least one SRS resource based on the preset frequency domain density parameter;

determine a time domain parameter N corresponding to the at least one SRS resource based on a type of a service request or uplink channel quality information of a known terminal;

determine the SRS resource configuration information of the at least one SRS resource based on the bandwidth configuration, the frequency domain density and the time domain parameter N;

when a value of N is greater than 1, the terminal is instructed to send the at least one SRS in a frequency hopping manner on N Orthogonal Frequency Division Multiplexing, OFDM, symbols within one slot or across different slots; when the value of N is equal to 1, the terminal is instructed to send the at least one SRS in the frequency hopping manner across different slots.

In some embodiments, in a case that the uplink channel used by the terminal is measured based on the at least one SRS and the corresponding uplink channel state information is determined, the processor is configured to:

generate at least one uplink channel information corresponding to the at least one SRS by measuring the uplink channel used by the terminal based on the at least one SRS;

determine the corresponding uplink channel state information by following steps:

determine X spatial domain basis vectors based on first uplink channel information included in the at least one uplink channel information, and determine angle information of the uplink channel based on the X spatial domain basis vectors; take the X spatial domain basis vectors as beams of a CSI-RS, and send a beamforming CSI-RS to the terminal through X ports to select L ports from the X ports by the terminal;

receive port indication information indicating the L ports returned by the terminal, and determine M frequency domain basis vectors based on the L ports and second uplink channel information included in the at least one uplink channel information; determine delay information of the uplink channel based on the M frequency domain basis vectors;

where X, L, and M are preset integers, and the first uplink channel information is same as the second uplink channel information, or the first uplink channel information is different from the second uplink channel information.

In some embodiments, in a case that the uplink channel used by the terminal is measured based on the at least one SRS and the corresponding uplink channel state information is determined, the processor is configured to:

generate at least one uplink channel information corresponding to the at least one SRS by measuring the uplink channel used by the terminal based on the at least one SRS;

determine the corresponding uplink channel state information by:

determining a spatial domain basis vector and a frequency domain basis vector based on the at least one uplink channel information, and determining angle information and delay information of the uplink channel based on the spatial domain basis vector and the frequency domain basis vector.

In one embodiment, an apparatus for obtaining uplink channel state information includes:

a configuration device, configured to determine SRS resource configuration information based on a preset bandwidth parameter, a preset frequency domain density parameter and a preset time domain parameter, in a case that determining to obtain the uplink channel state information;

a sending device, configured to send the SRS resource configuration information to a terminal, and receive at least one SRS reported by the terminal based on the SRS resource configuration information;

a processing device, configured to measure an uplink channel used by the terminal based on the at least one SRS, and determine the corresponding uplink channel state information.

In one embodiment, a storage medium is provided, where instructions in the storage medium, when executed by a processor, enable the processor to perform the method for obtaining uplink channel state information as described in any one of the above embodiments.

To sum up, in embodiments of the disclosure, the network side device generates the SRS resource configuration information based on the preset bandwidth parameter, the preset frequency domain density parameter and the preset time domain parameter, and then the network side device measures the uplink channel used by the terminal based on at least one SRS returned by the terminal, and determines the corresponding uplink channel state information. In this way, the SRS resource configuration information is generated through the frequency domain density parameter. The frequency domain density of the SRS resource can be adjusted, that is, the frequency domain density of the SRS resource can be reduced. Since the frequency domain density is reduced, the signal to interference plus noise ratio of each SRS RE can be improved compared with the existing SRS resource allocation method, to increase the coverage of the SRS. At the same time, the bandwidth of SRS resource configuration is increased through the bandwidth parameter, and the network side device can capture the transmission paths with different delays, to design a port selection codebook with higher precision.

BRIEF DESCRIPTION OF THE DRAWINGS

In order to illustrate the embodiments of the disclosure clearly, the accompanying figures describe the embodiments will be introduced below briefly. The accompanying figures described below are merely some embodiments of the disclosure.

DETAILED DESCRIPTION OF THE EMBODIMENTS

In the NR system, in order to obtain a transmission path with a smaller delay to design a port selection codebook with higher precision, in embodiments of the disclosure, the network side device configures at least one SRS resource for the terminal based on a preset bandwidth parameter, a preset frequency domain density parameter and a preset time domain parameters, and then measures an uplink channel based on at least one SRS to determine the uplink channel state information when receiving at least one SRS transmitted by the terminal using the at least one SRS resource.

The embodiments of the disclosure will be further described in detail below with reference to the accompanying drawings.

Figure 2:
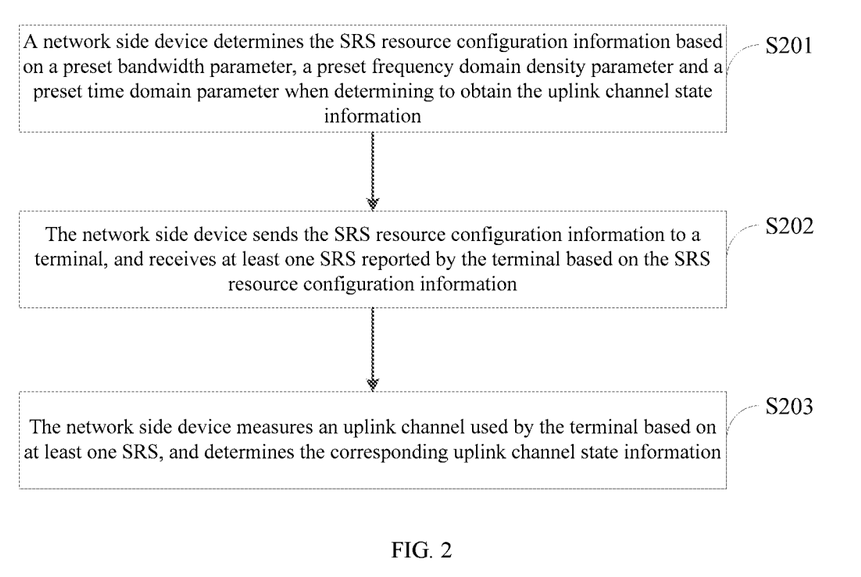
FIG. 2 is a schematic flowchart of a method for obtaining uplink channel state information according to an embodiment of the disclosure.

Referring to FIG. 2, a process of obtaining the uplink channel state information in an embodiment of the disclosure is as follows.

S201: a network side device determines the SRS resource configuration information based on a preset bandwidth parameter, a preset frequency domain density parameter and a preset time domain parameter when determining to obtain the uplink channel state information.

It should be noted that, in some embodiments of the disclosure, the uplink channel state information includes any one or a combination of angle information or delay information, where the angle information is used to characterize a signal emission angle and a signal arrival angle, and the delay information is used to characterize the time required for a signal to be sent from the terminal to the network side device.

In some embodiments of the disclosure, the network side device includes but is not limited to a base station, a micro cell, etc. In the following, only the base station is taken as an example for description.

The network side device determines to obtain the uplink channel state information when there are but not limited to the following cases.

Case 1: the network side device determines to obtain the uplink channel state information when determining to schedule the uplink data transmission of the terminal based on a service request sent by the terminal.

For example, the base station determines to obtain the angle information and delay information when determining to schedule the uplink data transmission of the terminal based on a service request sent by the terminal.

Case 2: the network side device determines to obtain the uplink channel state information when determining the precoding matrix for the downlink data transmission based on a service request sent by the terminal.

For example, the base station determines to obtain the angle information and delay information when determining the precoding matrix for the downlink data transmission based on a service request sent by the terminal.

When determining to obtain the uplink channel state information, the network side device may configure the SRS resources by using, but not limited to, the following steps.

A1. The network side device determines a bandwidth configuration of at least one SRS resource based on the preset bandwidth parameter.

In an embodiment of the disclosure, the preset bandwidth parameter may be determined according to the maximum allowable uplink scheduled Bandwidth Part (BWP) or may be determined according to the downlink scheduled BWP, where the value of the preset bandwidth parameter is an integer multiple of 4, and the preset bandwidth parameter is not greater than the maximum value of the downlink scheduled BWP when the preset bandwidth parameter is determined according to the downlink scheduled BWP.

For example, it is assumed that the preset bandwidth parameter is determined according to the maximum allowed uplink scheduled BWP, which is 256 PRBs. The base station determines the bandwidth configuration of the SRS resource 1 as $C_{SRS}=57$ and $B_{SRS}=0$ based on the maximum allowed uplink scheduled BWP, where $C_{SRS}=57$ and $B_{SRS}=0$ indicate that the bandwidth of the SRS resource 1 is 256 PRBs, and the SRS resource 1 is sent in the non-frequency hopping manner.

For another example, it is assumed that the preset bandwidth parameter is determined according to the downlink scheduled BWP, which is 256 PRBs. The base station configures the bandwidth of the SRS resource 1 as $C_{SRS}=57$ and $B_{SRS}=2$ based on the downlink scheduled BWP, where $C_{SRS}=57$ and $B_{SRS}=2$ indicate that the bandwidth of the SRS resource 1 is 256 PRBs, and the SRS resource 2 is sent in the frequency hopping manner.

A2. The network side device determines the frequency domain density of at least one SRS resource based on the preset frequency domain density parameter.

In an embodiment of the disclosure, the preset frequency domain density parameter may be determined according to the frequency domain density of a downlink Channel State Information-Reference Signal (CSI-RS), or may be determined according to the sub-band size of a Precoding Matrix Indicator (PMI).

In some embodiments, when the preset frequency domain density parameter is determined according to the sub-band size of the PMI, the sub-band size of the Channel Quality Indication (CQI) is $N_{PRB}^{SB}$, and the sub-band size of the PMI is $N_{PRB}^{SB}/R$, then the network side device determines the frequency domain density k of at least one SRS resource as $R/N_{PRB}^{SB}$ based on the preset frequency domain density parameter, where R represents the number of PMIs corresponding to a CQI sub-band during downlink data transmission, and $N_{PRB}^{SB}$ represents the number of PRBs included in a CQI sub-band.

For example, it is assumed that the preset frequency domain density parameter is determined according to the frequency domain density of the CSI-RS, which is 0.25RE/Resource Block (RB)/PORT. The base station determines the frequency domain density of the SRS resource 1 as 0.25RE/RB/PORT based on the frequency domain density of the CSI-RS.

For another example, it is assumed that the preset frequency domain density parameter is determined according to the sub-band size of the PMI, where the sub-band size $N_{PRB}^{SB}$ of the CQI is 4 PRBs, and the value of R is 1. At this time, the sub-band size $N_{PRB}^{SB}/R$ of the PMI is 4. Then, the base station determines the frequency domain density k of the SRS resource 2 as 0.25 RE/RB/PORT based on the sub-band sizes of the CQI and the PMI.

A3. The network side device determines a time domain parameter N corresponding to at least one SRS resource based on the type of a service request or the uplink channel quality information of a known terminal.

In an embodiment of the disclosure, when the value of N is greater than 1, the terminal is instructed to send the at least one SRS in the frequency hopping manner on N OFDM symbols within one slot or across different slots; when the value of N is equal to 1, the terminal is instructed to send the at least one SRS in the frequency hopping manner across different slots.

Figure 3:
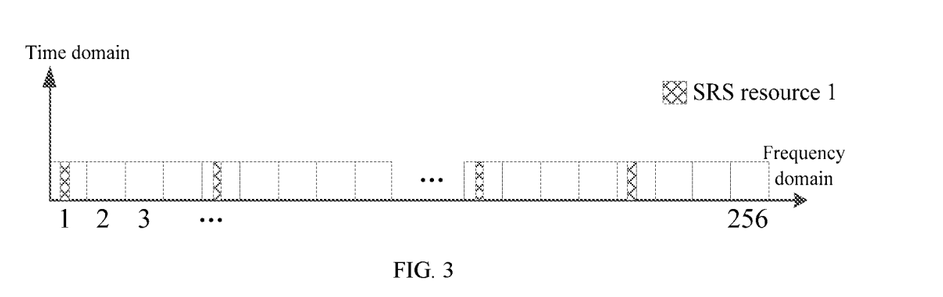
FIG. 3 is a schematic diagram of a frequency domain density of SRS resources according to an embodiment of the disclosure.

For example, the base station determines the value of the time domain parameter N of the SRS resource 1 as 1 based on the type of the service request. The schematic diagram of the frequency domain density of the SRS resource 1 is shown in FIG. 3, when the value of N is 1, the terminal is instructed to send the SRS1 in the frequency hopping manner across different slots.

Figure 4:
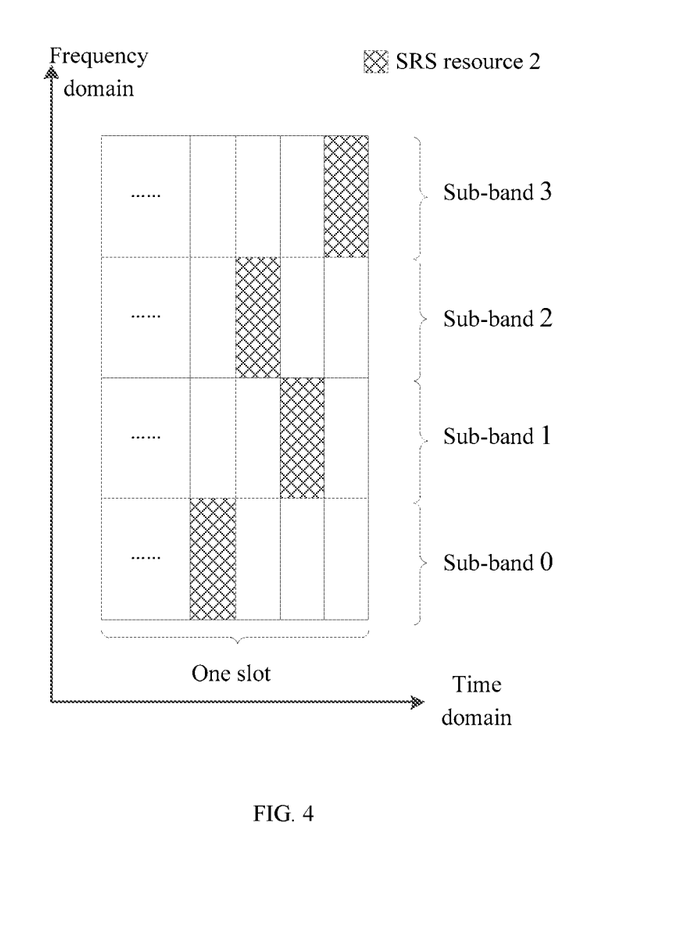
FIG. 4 is a schematic diagram of another frequency domain density of SRS resources according to an embodiment of the disclosure.

For another example, the base station determines the value of the time domain parameter N of the SRS resource 2 as 4 based on the uplink channel quality information of the known terminal. The schematic diagram of the frequency domain density of the SRS resource 2 is shown in FIG. 4, when the value of N is 4, the terminal is instructed to send the SRS1 in the frequency hopping manner on 4 OFDM symbols in a slot.

A4. The network side device determines the SRS resource configuration information of at least one SRS resource based on the bandwidth configuration, the frequency domain density and the time domain parameter N.

For example, the base station determines the SRS resource configuration information 1 of the SRS resource 1 based on the bandwidth configuration of 256 PRBs, the frequency domain density of 0.25 RE/RB/PORT, and the time domain parameter N=1.

For another example, the base station determines the SRS resource configuration information 2 of the SRS resource 2 based on the bandwidth configuration of 256 PRBs, the frequency domain density of 0.25 RE/RB/PORT, and the time domain parameter N=4.

It should be noted that, in some embodiments of the disclosure, it is also necessary to determine a period configuration corresponding to at least one SRS resource based on the preset time domain characteristics when determining the SRS resource configuration information of at least one SRS resource, where the period configuration is used to indicate that the SRS is sent in a periodic, semi-persistent or aperiodic manner.

For example, the base station determines the period configuration 1 of the SRS resource 1 based on the preset time domain characteristics, where the period configuration 1 indicates that the SRS1 is sent in an aperiodic manner.

It should be noted that, in some embodiments of the disclosure, at least one SRS resource corresponding to the SRS resource configuration information may be included in a same SRS resource set or in different SRS resource sets, which is not limited in the disclosure.

S202: the network side device sends the SRS resource configuration information to a terminal, and receives at least one SRS reported by the terminal based on the SRS resource configuration information.

For example, the base station sends the SRS resource configuration information 1 and SRS resource configuration information 2 to the terminal, and receives the SRS1 and SRS2 reported by the terminal based on the SRS resource configuration information 1 and SRS resource configuration information 2.

S203: the network side device measures an uplink channel used by the terminal based on at least one SRS, and determines the corresponding uplink channel state information.

In an embodiment of the disclosure, the uplink channel state information may be determined in but not limited to two following ways.

In the first way: determine the uplink channel state information in a one-step way.

B1. The network side device generates at least one uplink channel information corresponding to the at least one SRS by measuring the uplink channel used by the terminal based on at least one SRS.

It should be noted that, in the embodiment of the disclosure, the uplink channel information includes, but is not limited to, angle information, delay information, Doppler shift information, uplink channel signal amplitude, phase information, and other information. Since all the above-mentioned information is encapsulated in the uplink channel information, the uplink channel information needs to be further processed to obtain various information such as angle information and delay information.

For example, the base station measures the uplink channel used by the terminal based on the SRS1 and SRS2, and generates the uplink channel information 1 corresponding to the SRS1 and the uplink channel information 2 corresponding to the SRS2.

B2. The network side device determines a spatial domain basis vector and a frequency domain basis vector based on at least one uplink channel information.

For example, the base station determines the spatial domain basis vector 1 based on the uplink channel information 1, and determines the frequency domain basis vector 1 based on the uplink channel information 2.

B3. The network side device determines the angle information and delay information of the uplink channel based on the spatial domain basis vector and the frequency domain basis vector.

For example, the base station determines the angle information 1 of the uplink channel based on the spatial domain basis vector 1, and determines the delay information 1 of the uplink channel based on the frequency domain basis vector 1.

It should be noted that, in some embodiments of the disclosure, when the uplink channel state information is determined in the one-step manner, the steps B1, B2, and B3 are one step, and the step is broken down for clarity of description in the disclosure.

In the second way: determine the uplink channel state information in a two-step way.

C1. The network side device generates at least one uplink channel information corresponding to the at least one SRS by measuring the uplink channel used by the terminal based on at least one SRS.

For example, the base station measures the uplink channel used by the terminal based on the SRS1 and SRS2, and generates the uplink channel information 1 corresponding to the SRS1 and the uplink channel information 2 corresponding to the SRS2.

C2. The network side device determines X spatial domain basis vectors based on the first uplink channel information included in the at least one uplink channel information, and determines the angle information of the uplink channel based on the X spatial domain basis vectors.

For example, the base station determines 8 spatial domain basis vectors 2 based on the uplink channel information 1, and determines the angle information 2 of the uplink channel based on the 8 spatial domain basis vectors 2.

C3. The network side device takes the X spatial domain basis vectors as beams of a CSI-RS, and sends a beam-forming CSI-RS to the terminal through X ports and the terminal selects L ports from the X ports.

For example, the base station takes 8 spatial domain basis vectors 2 as beams of the CSI-RS, and sends the beam-forming CSI-RS to the terminal through 8 ports, and the terminal selects 4 ports from the 8 ports.

C4. The network side device receives the port indication information indicating the L ports returned by the terminal, and determines M frequency domain basis vectors based on the L ports and the second uplink channel information included in the at least one uplink channel information.

For example, the base station receives the port indication information that is returned by the terminal and that characterizes 4 ports selected by the terminal, and determines 4 frequency domain basis vectors 2 based on the 4 ports and the uplink channel information 2.

C5. The network side device determines the corresponding delay information based on the M frequency domain basis vectors.

For example, the base station determines the delay information 2 of the uplink channel based on 4 frequency domain basis vectors 2.

It should be noted that, in some embodiments of the disclosure, the parameters such as R, N, $N_{PRB}^{SB}$, X, L and M may be pre-configured by the network side device for the terminal, or may be pre-defined by the network side device and the terminal, or may be reported by the terminal, which is not limited in the disclosure, and the values of R, N, $N_{PRB}^{SB}$, X, L and M are integers.

It should be noted that, in some embodiments of the disclosure, when the uplink channel state information is determined in the two-step manner, the steps C1, C2, and C3 are the first step, and the steps C4 and C5 are the second step. Each step of operation is broken down for clarity of description in the disclosure.

Next, taking the case that the network side device configures one SRS resource for the terminal as an example, the first way for the network side device to determine the uplink channel state information will be illustrated.

It is assumed that the downlink scheduled BWP is 256 PRBs, the sub-band size $N_{PRB}^{SB}$ of the CQI is 4 PRBs, and the value of R is 1. When determining to obtain the uplink channel state information, the network side device determines that the bandwidth configuration of the SRS resource 3 is $C_{SRS}=57$ and $B_{SRS}=0$ based on the downlink scheduled BWP, where $C_{SRS}=57$ and $B_{SRS}=0$ indicates that the bandwidth of the SRS resource 3 is 256 PRBs and the SRS resource 3 is sent in the non-frequency hopping manner. Then, the network side device determines that the frequency domain density k of the SRS resource 3 is 0.25 RE/RB/PORT based on the sub-band size of the PMI, and determines that the value of the time domain parameter N of the SRS resource 3 is 1 based on the uplink channel quality information of the known terminal. Next, the network side device determines the SRS resource configuration information 3 of the SRS resource 3 based on the bandwidth configuration, the frequency domain density k and the time domain parameter N.

The network side device sends the SRS resource configuration information 3 to the terminal, and receives the SRS3 reported by the terminal based on the SRS resource configuration information 3.

The network side device measures the uplink channel used by the terminal based on the SRS3, and generates the uplink channel information 3 corresponding to the SRS3. Then, the network side device determines the spatial domain basis vector 3 and the frequency domain basis vector 3 based on the uplink channel information 3, and determines the angle information 3 and the delay information 3 of the uplink channel respectively based on the spatial domain basis vector 3 and the frequency domain basis vector 3.

Next, still taking the case that the network side device configures one SRS resource for the terminal as an example, the second way for the network side device to determine the uplink channel state information will be illustrated.

It is assumed that the downlink scheduled BWP is 256 PRBs. When determining to obtain the uplink channel state information, the network side device determines the SRS resource configuration information 3 of the SRS resource 3, where the bandwidth configuration of the SRS resource 3 is $C_{SRS}=57$ and $B_{SRS}=0$, the frequency domain density k of the SRS resource 3 is 0.25 RE/RB/PORT, and the value of the time domain parameter N of the SRS resource 3 is 1. Since the specific process of determining the bandwidth configuration, the frequency domain density k and the time domain parameter N of the SRS3 resource is the same as that in the above, which will not be repeated here.

The network side device sends the SRS resource configuration information 3 to the terminal, and receives the SRS3 reported by the terminal based on the SRS resource configuration information 3.

The network side device measures the uplink channel used by the terminal based on the SRS3, and generates the uplink channel information 3 corresponding to the SRS3. Then, the network side device determines 8 spatial domain basis vectors 3 based on the uplink channel information 3, and determines the angle information 3 of the uplink channel based on the 8 spatial domain basis vectors 3. Next, the network side device takes the 8 spatial domain basis vectors 3 as beams of the CSI-RS, and sends a beam-forming CSI-RS to the terminal through 8 ports, and the terminal selects 4 ports from the 8 ports. The network side device receives the port indication information that is returned by the terminal and that characterizes 4 ports selected by the terminal, and determines 4 frequency domain basis vectors 3 based on the 4 ports and the uplink channel information 3. After that, the network side device determines the delay information 3 of the uplink channel based on the 4 frequency domain basis vectors 3.

Next, taking the case that the network side device configures two SRS resources for the terminal as an example, the first way for the network side device to determine the uplink channel state information will be illustrated, where the resource configuration method in the prior art is used for one SRS resource, and the resource configuration method provided in the disclosure is used for the other SRS resource.

It is assumed that the downlink scheduled BWP is 256 PRBs. When determining to obtain the uplink channel state information, the network side device firstly configures the bandwidth of the SRS resource 4 as $C_{SRS}=14$ and $B_{SRS}=0$ and sets the value of the Comb parameter as 2 based on the resource configuration method in the prior art, where $C_{SRS}=14$ and $B_{SRS}=0$ indicates that the bandwidth of the SRS resource 1 is 52 PRBs and the SRS resource 4 is sent in the non-frequency hopping manner, and the value of the Comb parameter being 2 indicates that SRS resource 4 is transmitted at every other subcarrier in the frequency domain. Then, the network side device determines the resource configuration information 4 of the SRS resource 4 based on the bandwidth configuration of the SRS resource 4 and the value of the Comb parameter. At the same time, the network side device determines the SRS resource configuration information 3 of the SRS resource 3 based on the downlink scheduled BWP, the sub-band size of the PMI and the uplink channel quality information of the known terminal, where the bandwidth configuration of the SRS resource 3 is $C_{SRS}=57$ and $B_{SRS}=0$, the frequency domain density k of the SRS resource 3 is 0.25 RE/RB/PORT, and the value of the time domain parameter N of the SRS resource 3 is 1. Since the specific process of determining the bandwidth configuration, the frequency domain density k and the time domain parameter N of the SRS3 resource is the same as that in the above, which will not be repeated here.

The network side device sends the SRS resource configuration information 3 and SRS resource configuration information 4 to the terminal, and receives the SRS3 and SRS4 reported by the terminal based on the SRS resource configuration information 3 and SRS resource configuration information 4.

The network side device measures the uplink channel used by the terminal based on the SRS3 and SRS4, and generates the uplink channel information 3 corresponding to the SRS1 and the uplink channel information 4 corresponding to the SRS4. Then, the network side device determines the spatial domain basis vector 4 based on the uplink channel information 4, and determines the frequency domain basis vector 4 based on the uplink channel information 1. Then, the network side device determines the angle information 4 of the uplink channel based on the spatial domain basis vector 4, and determines the delay information of the uplink channel based on the frequency domain basis vector 4.

Next, taking the case that the network side device configures two SRS resources for the terminal as an example, the second way for the network side device to determine the uplink channel state information will be illustrated, where the resource configuration method in the prior art is used for one SRS resource, and the resource configuration method provided in the disclosure is used for the other SRS resource.

It is assumed that the downlink scheduled BWP is 256 PRBs. When determining to obtain the uplink channel state information, the network side device firstly configures the bandwidth of the SRS resource 4 as $C_{SRS}=14$ and $B_{SRS}=0$ and sets the value of the Comb parameter as 2 based on the resource configuration method in the prior art, where $C_{SRS}=14$ and $B_{SRS}=0$ indicates that the bandwidth of the SRS resource 1 is 52 PRBs and the SRS resource 4 is sent in the non-frequency hopping manner, and the value of the Comb parameter being 2 indicates that SRS resource 4 is transmitted at every other subcarrier in the frequency domain. Then, the network side device determines the resource configuration information 4 of the SRS resource 4 based on the bandwidth configuration of the SRS resource 4 and the value of the Comb parameter. At the same time, the network side device determines the SRS resource configuration information 3 of the SRS resource 3 based on the downlink scheduled BWP, the sub-band size of the PMI and the uplink channel quality information of the known terminal, where the bandwidth configuration of the SRS resource 3 is $C_{SRS}=57$ and $B_{SRS}=0$, the frequency domain density k of the SRS resource 3 is 0.25 RE/RB/PORT, and the value of the time domain parameter N of the SRS resource 3 is 1. Since the specific process of determining the bandwidth configuration, the frequency domain density k and the time domain parameter N of the SRS3 resource is the same as that in the above, which will not be repeated here.

The network side device sends the SRS resource configuration information 3 and SRS resource configuration information 4 to the terminal, and receives the SRS3 and SRS4 returned by the terminal based on the SRS resource configuration information 3 and SRS resource configuration information 4.

The network side device measures the uplink channel used by the terminal based on the SRS3 and SRS4, and generates the uplink channel information 3 corresponding to the SRS3 and the uplink channel information 4 corresponding to the SRS4. Then, the network side device determines 8 spatial domain basis vectors 5 based on the uplink channel information 4, and determines the angle information 5 of the uplink channel based on the 8 spatial domain basis vectors 5. Next, the network side device takes the 8 spatial domain basis vectors 5 as beams of the CSI-RS, and sends a beam-forming CSI-RS to the terminal through 8 ports, and the terminal selects 4 ports from the 8 ports. The network side device receives the port indication information that is returned by the terminal and that characterizes 4 ports selected by the terminal, and determines 4 frequency domain basis vectors 5 based on the 4 ports and the uplink channel information 3. After that, the network side device determines the delay information 5 of the uplink channel based on the 4 frequency domain basis vectors 5.

Figure 5:
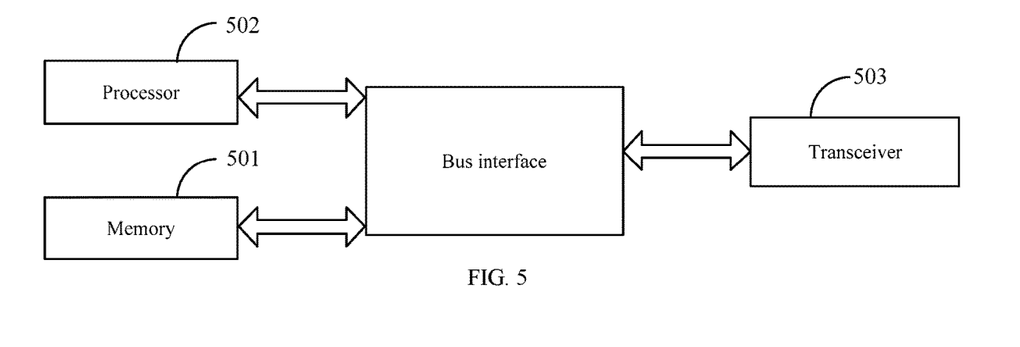
FIG. 5 is a schematic diagram of a physical architecture of an apparatus for obtaining uplink channel state information according to an embodiment of the disclosure.

Referring to FIG. 5, an embodiment of the disclosure provides an apparatus for obtaining uplink channel state information, including at least:

a memory 501 configured to store executable instructions;

a processor 502 configured to read and execute the executable instructions stored in the memory to perform the process of:

determining SRS resource configuration information based on a preset bandwidth parameter, a preset frequency domain density parameter and a preset time domain parameter when determining to obtain the uplink channel state information;

sending the SRS resource configuration information to a terminal, and receiving at least one SRS reported by the terminal based on the SRS resource configuration information;

measuring an uplink channel used by the terminal based on the at least one SRS, and determining the corresponding uplink channel state information.

In some embodiments, the uplink channel state information includes angle information and/or delay information, where the angle information is used to characterize a signal emission angle and a signal arrival angle, and the delay information is used to characterize the time required for a signal to be sent from the terminal to the network side device.

In some embodiments, the preset bandwidth parameter is determined according to a maximum allowed uplink scheduled BWP or downlink scheduled BWP, and the preset frequency domain density parameter is determined according to a frequency domain density of a downlink CSI-RS or a sub-band size of a PMI, where a value of the preset bandwidth parameter is an integer multiple of 4, and the preset bandwidth parameter is not greater than a maximum value of the downlink scheduled BWP when the preset bandwidth parameter is determined according to the downlink scheduled BWP.

In some embodiments, when determining the SRS resource configuration information based on the preset bandwidth parameter, the preset frequency domain density parameter and the preset time domain parameter, the processor 502 is configured to:
  determine a bandwidth configuration of at least one SRS resource based on the preset bandwidth parameter;
  determine a frequency domain density of the at least one SRS resource based on the preset frequency domain density parameter;
  determine a time domain parameter N corresponding to the at least one SRS resource based on a type of a service request or uplink channel quality information of a known terminal;
  determine the SRS resource configuration information of the at least one SRS resource based on the bandwidth configuration, the frequency domain density and the time domain parameter N;
  when a value of N is greater than 1, the terminal is instructed to send the at least one SRS in a frequency hopping manner on N Orthogonal Frequency Division Multiplexing, OFDM, symbols within one slot or across different slots; when the value of N is equal to 1, the terminal is instructed to send the at least one SRS in the frequency hopping manner across different slots.

In some embodiments, when measuring the uplink channel used by the terminal based on the at least one SRS and determining the corresponding uplink channel state information, the processor 502 is configured to:
  generate at least one uplink channel information corresponding to the at least one SRS by measuring the uplink channel used by the terminal based on the at least one SRS;
  determine the corresponding uplink channel state information by:
  determining X spatial domain basis vectors based on first uplink channel information included in the at least one uplink channel information, and determining angle information of the uplink channel based on the X spatial domain basis vectors; taking the X spatial domain basis vectors as beams of a CSI-RS, and sending a beam-forming CSI-RS to the terminal through X ports and the terminal selects L ports from the X ports;
  receiving port indication information characterizing the L ports returned by the terminal, and determining M frequency domain basis vectors based on the L ports and second uplink channel information included in the at least one uplink channel information; determining delay information of the uplink channel based on the M frequency domain basis vectors;
  where X, L, and M are preset integers, and the first uplink channel information is same as the second uplink channel information, or the first uplink channel information is different from the second uplink channel information.

In some embodiments, when measuring the uplink channel used by the terminal based on the at least one SRS and determining the corresponding uplink channel state information, the processor 502 is configured to:
  generate at least one uplink channel information corresponding to the at least one SRS by measuring the uplink channel used by the terminal based on the at least one SRS;
  determine the corresponding uplink channel state information by:
  determining a spatial domain basis vector and a frequency domain basis vector based on the at least one uplink channel information, and determining angle information and delay information of the uplink channel based on the spatial domain basis vector and the frequency domain basis vector. A transceiver 503 is configured to receive and send the data under the control of the processor 502.

Here, in FIG. 5, the bus architecture may include any numbers of interconnected buses and bridges, and link various circuits of one or more processors represented by the processor 502 and the memory represented by the memory 501. The bus architecture may further link various other circuits such as peripheral device, voltage regulator and power management circuit, which are all well known in the art and thus will not be further described again herein. The bus interface provides an interface. The transceiver 503 may be multiple elements, i.e., include a transmitter and a receiver, and provide the devices for communicating with various other devices over the transmission media. The processor 502 is responsible for managing the bus architecture and general processing, and the memory 501 may store the data used by the processor 502 when performing the operations.

Figure 6:
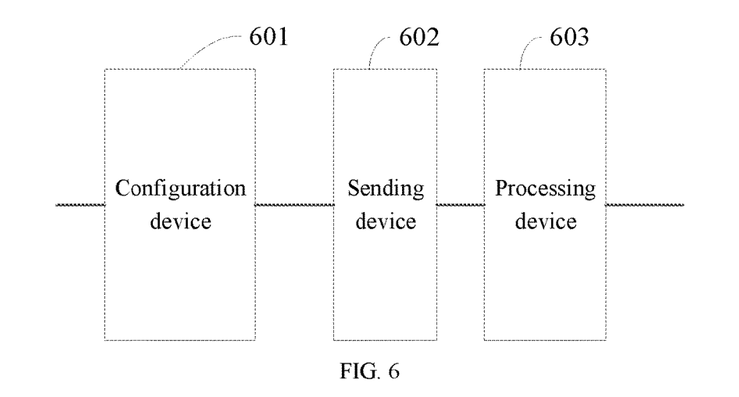
FIG. 6 is a schematic diagram of a logical architecture of an apparatus for obtaining uplink channel state information according to an embodiment of the disclosure.

An embodiment of the disclosure provides an apparatus for obtaining uplink channel state information, as shown in FIG. 6, which at least includes: a configuration device 601, a sending device 602 and a processing device 603;
  the configuration device 601 is configured to determine SRS resource configuration information based on a preset bandwidth parameter, a preset frequency domain density parameter and a preset time domain parameter when determining to obtain the uplink channel state information;
  the sending device 602 is configured to send the SRS resource configuration information to a terminal, and receive at least one SRS reported by the terminal based on the SRS resource configuration information;
  the processing device 603 is configured to measure an uplink channel used by the terminal based on the at least one SRS, and determine the corresponding uplink channel state information.

The configuration device 601, the sending device 602 and the processing device 603 cooperate with each other to realize the functions of the apparatus for obtaining the uplink channel state information in the above embodiments.

An embodiment of the disclosure provides a storage medium, where the instructions in the storage medium, when executed by a processor, enable the processor to perform any method implemented by the apparatus for obtaining the uplink channel state information in the above process.

To sum up, in some embodiments of the disclosure, the network side device generates the SRS resource configuration information based on the preset bandwidth parameter, the preset frequency domain density parameter and the preset time domain parameter, and then the network side device measures the uplink channel used by the terminal based on at least one SRS returned by the terminal, and determines the corresponding uplink channel state information. In this way, the SRS resource configuration information is generated through the frequency domain density parameter. The frequency domain density of the SRS resource can be adjusted, that is, the frequency domain density of the SRS resource can be reduced. Since the frequency domain density is reduced, the signal to interference plus noise ratio of each SRS RE can be improved compared with the existing SRS resource allocation method, to increase the coverage of the SRS. At the same time, the bandwidth of SRS resource configuration can be increased through the bandwidth parameter, and the network side device can capture the transmission paths with different delays, to design a port selection codebook with higher precision.

For the system/apparatus embodiments, they are substantially similar to the method embodiments, so the description thereof is relatively simple, and the related parts may refer to the partial illustration of the method embodiments.

It should be noted that the relational terms such as first and second herein are only used to distinguish one entity or operation from another and do not necessarily require or imply any such actual relationship or sequence between these entities or operations.

The embodiments of the disclosure can be provided as methods, systems and computer program products. Thus, the disclosure can take the form of hardware embodiments alone, software embodiments alone, or embodiments combining the software and hardware aspects. Also the disclosure can take the form of computer program products implemented on one or more computer usable storage mediums (including but not limited to magnetic disk memories, CD-ROMs, optical memories and the like) containing computer usable program codes therein.

The disclosure is described by reference to the flow charts and/or the block diagrams of the methods, the devices (systems) and the computer program products according to the embodiments of the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, and an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which may guide the computer or another programmable data processing device to operate in a particular way, and the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, and a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A method for obtaining uplink channel state information, comprising:
   determining, by a network side device, Sounding Reference Signal, SRS, resource configuration information based on a preset bandwidth parameter, a preset frequency domain density parameter and a preset time domain parameter, in a case that the network side device determines to obtain the uplink channel state information;
   sending, by the network side device, the SRS resource configuration information to a terminal;
   receiving, by the network side device, at least one SRS reported by the terminal based on the SRS resource configuration information; and
   measuring, by the network side device, an uplink channel used by the terminal based on the at least one SRS, and determining the corresponding uplink channel state information;
   wherein, the determining, by the network side device, the SRS resource configuration information based on the preset bandwidth parameter, the preset frequency domain density parameter and the preset time domain parameter, further comprises:
   determining, by the network side device, a bandwidth configuration of at least one SRS resource based on the preset bandwidth parameter;
   determining, by the network side device, a frequency domain density of the at least one SRS resource based on the preset frequency domain density parameter;
   determining, by the network side device, a time domain parameter N corresponding to the at least one SRS resource based on a type of a service request or uplink channel quality information of a known terminal; and
   determining, by the network side device, the SRS resource configuration information of the at least one SRS resource based on the bandwidth configuration, the frequency domain density and the time domain parameter N;
   wherein the terminal is instructed to send the at least one SRS in a frequency hopping manner on N Orthogonal Frequency Division Multiplexing, OFDM, symbols within one slot or across different slots in response to a value of N being greater than 1;
   the terminal is instructed to send the at least one SRS in a frequency hopping manner across different slots in response to a value of N being equal to 1.

2. The method according to claim 1, wherein:
   the preset bandwidth parameter is determined according to a maximum allowed uplink scheduled Bandwidth Part, BWP, or a maximum allowed downlink scheduled BWP; and
   the preset frequency domain density parameter is determined according to a frequency domain density of a downlink Channel State Information-Reference Signal, CSI-RS, or a sub-band size of a Precoding Matrix Indicator, PMI;
   wherein a value of the preset bandwidth parameter is an integer multiple of 4, and the preset bandwidth parameter is not greater than a maximum value of the downlink scheduled BWP in a case that the value of the preset bandwidth parameter is determined according to the downlink scheduled BWP.

3. The method according to claim 2, wherein, the measuring, by the network side device, the uplink channel used by the terminal based on the at least one SRS, and determining the corresponding uplink channel state information, comprises:

generating, by the network side device, at least one uplink channel information corresponding to the at least one SRS by measuring the uplink channel used by the terminal based on the at least one SRS;

determining, by the network side device, the corresponding uplink channel state information by:

determining, by the network side device, X spatial domain basis vectors based on first uplink channel information included in the at least one uplink channel information;

determining, by the network side device, angle information in the uplink channel state information based on the X spatial domain basis vectors;

taking, by the network side device, the X spatial domain basis vectors as beams of a CSI-RS;

sending, by the network side device, a beam-forming CSI-RS to the terminal through X ports to select L ports from the X ports by the terminal;

receiving, by the network side device, port indication information indicating the L ports returned by the terminal;

determining, by the network side device, M frequency domain basis vectors based on the L ports and second uplink channel information included in the at least one uplink channel information; and determining, by the network side device, delay information in the uplink channel state information based on the M frequency domain basis vectors;

wherein X, L, and M are preset integers, and the first uplink channel information is same as the second uplink channel information, or the first uplink channel information is different from the second uplink channel information.

4. The method according to claim 2, wherein, the measuring, by the network side device, the uplink channel used by the terminal based on the at least one SRS, and determining the corresponding uplink channel state information, further comprises:

generating, by the network side device, at least one uplink channel information corresponding to the at least one SRS by measuring the uplink channel used by the terminal based on the at least one SRS;

determining, by the network side device, the corresponding uplink channel state information by:

determining, by the network side device, a spatial domain basis vector and a frequency domain basis vector based on the at least one uplink channel information; and determining, by the network side device, angle information and delay information in the uplink channel state information based on the spatial domain basis vector and the frequency domain basis vector.

5. The method according to claim 1, wherein, the measuring, by the network side device, the uplink channel used by the terminal based on the at least one SRS, and determining the corresponding uplink channel state information, comprises:

generating, by the network side device, at least one uplink channel information corresponding to the at least one SRS by measuring the uplink channel used by the terminal based on the at least one SRS;

determining, by the network side device, the corresponding uplink channel state information by:

determining, by the network side device, X spatial domain basis vectors based on first uplink channel information included in the at least one uplink channel information;

determining, by the network side device, angle information in the uplink channel state information based on the X spatial domain basis vectors;

taking, by the network side device, the X spatial domain basis vectors as beams of a CSI-RS;

sending, by the network side device, a beam-forming CSI-RS to the terminal through X ports to select L ports from the X ports by the terminal;

receiving, by the network side device, port indication information indicating the L ports returned by the terminal;

determining, by the network side device, M frequency domain basis vectors based on the L ports and second uplink channel information included in the at least one uplink channel information; and determining, by the network side device, delay information in the uplink channel state information based on the M frequency domain basis vectors;

wherein X, L, and M are preset integers, and the first uplink channel information is same as the second uplink channel information, or the first uplink channel information is different from the second uplink channel information.

6. The method according to claim 1, wherein, the measuring, by the network side device, the uplink channel used by the terminal based on the at least one SRS, and determining the corresponding uplink channel state information, further comprises:

generating, by the network side device, at least one uplink channel information corresponding to the at least one SRS by measuring the uplink channel used by the terminal based on the at least one SRS;

determining, by the network side device, the corresponding uplink channel state information by:

determining, by the network side device, a spatial domain basis vector and a frequency domain basis vector based on the at least one uplink channel information; and determining, by the network side device, angle information and delay information in the uplink channel state information based on the spatial domain basis vector and the frequency domain basis vector.

7. A non-transitory storage medium storing instructions, wherein the instructions, when executed by a processor, enable the processor to perform the method for obtaining uplink channel state information according to claim 1.

8. An apparatus for obtaining uplink channel state information, comprising:

a memory configured to store executable instructions;

a processor configured to read and execute the executable instructions stored in the memory to perform a process of:

determining Sounding Reference Signal, SRS, resource configuration information based on a preset bandwidth parameter, a preset frequency domain density parameter and a preset time domain parameter, in a case that determining to obtain the uplink channel state information;

sending the SRS resource configuration information to a terminal;

receiving at least one SRS reported by the terminal based on the SRS resource configuration information; and measuring an uplink channel used by the terminal based on the at least one SRS, and determining the corresponding uplink channel state information;

wherein in a case that the SRS resource configuration information is determined based on the preset bandwidth parameter, the preset frequency domain density parameter and the preset time domain parameter, the processor is further configured to:

determine a bandwidth configuration of at least one SRS resource based on the preset bandwidth parameter;

determine a frequency domain density of the at least one SRS resource based on the preset frequency domain density parameter;

determine a time domain parameter N corresponding to the at least one SRS resource based on a type of a service request or uplink channel quality information of a known terminal; and determine the SRS resource configuration information of the at least one SRS resource based on the bandwidth configuration, the frequency domain density and the time domain parameter N;

wherein the terminal is instructed to send the at least one SRS in a frequency hopping manner on N Orthogonal Frequency Division Multiplexing, OFDM, symbols within one slot or across different slots in response to a value of N being greater than 1;

the terminal is instructed to send the at least one SRS in a frequency hopping manner across different slots in response to a value of N being equal to 1.

9. The apparatus according to claim 8, wherein:

the preset bandwidth parameter is determined according to a maximum allowed uplink scheduled Bandwidth Part, BWP, or a maximum allowed downlink scheduled BWP; and the preset frequency domain density parameter is determined according to a frequency domain density of a downlink Channel State Information-Reference Signal, CSI-RS, or a sub-band size of a Precoding Matrix Indicator, PMI;

wherein a value of the preset bandwidth parameter is an integer multiple of 4, and the preset bandwidth parameter is not greater than a maximum value of the downlink scheduled BWP, in a case that the value of the preset bandwidth parameter is determined according to the downlink scheduled BWP.

10. The apparatus according to claim 9, wherein in a case that the uplink channel used by the terminal is measured based on the at least one SRS and the corresponding uplink channel state information is determined, the processor is further configured to:

generate at least one uplink channel information corresponding to the at least one SRS by measuring the uplink channel used by the terminal based on the at least one SRS;

determine the corresponding uplink channel state information by:

determining X spatial domain basis vectors based on first uplink channel information included in the at least one uplink channel information;

determining angle information in the uplink channel state information based on the X spatial domain basis vectors;

taking the X spatial domain basis vectors as beams of a CSI-RS;

sending a beam-forming CSI-RS to the terminal through X ports to select L ports from the X ports by the terminal;

receiving port indication information indicating the L ports returned by the terminal;

determining M frequency domain basis vectors based on the L ports and second uplink channel information included in the at least one uplink channel information; and determining delay information in the uplink channel state information based on the M frequency domain basis vectors;

wherein X, L, and M are preset integers, and the first uplink channel information is same as the second uplink channel information, or the first uplink channel information is different from the second uplink channel information.

11. The apparatus according to claim 9, wherein in a case that the uplink channel used by the terminal is measured based on the at least one SRS and the corresponding uplink channel state information is determined, the processor is further configured to:

generate at least one uplink channel information corresponding to the at least one SRS by measuring the uplink channel used by the terminal based on the at least one SRS;

determine the corresponding uplink channel state information by:

determining a spatial domain basis vector and a frequency domain basis vector based on the at least one uplink channel information, and determining angle information and delay information in the uplink channel state information based on the spatial domain basis vector and the frequency domain basis vector.

12. The apparatus according to claim 8, wherein in a case that the uplink channel used by the terminal is measured based on the at least one SRS and the corresponding uplink channel state information is determined, the processor is further configured to:

generate at least one uplink channel information corresponding to the at least one SRS by measuring the uplink channel used by the terminal based on the at least one SRS;

determine the corresponding uplink channel state information by:

determining X spatial domain basis vectors based on first uplink channel information included in the at least one uplink channel information;

determining angle information in the uplink channel state information based on the X spatial domain basis vectors;

taking the X spatial domain basis vectors as beams of a CSI-RS;

sending a beam-forming CSI-RS to the terminal through X ports to select L ports from the X ports by the terminal;

receiving port indication information indicating the L ports returned by the terminal;

determining M frequency domain basis vectors based on the L ports and second uplink channel information included in the at least one uplink channel information; and determining delay information in the uplink channel state information based on the M frequency domain basis vectors;

wherein X, L, and M are preset integers, and the first uplink channel information is same as the second uplink channel information, or the first uplink channel information is different from the second uplink channel information.

13. The apparatus according to claim 8, wherein in a case that the uplink channel used by the terminal is measured based on the at least one SRS and the corresponding uplink channel state information is determined, the processor is further configured to:

generate at least one uplink channel information corresponding to the at least one SRS by measuring the uplink channel used by the terminal based on the at least one SRS;
determine the corresponding uplink channel state information by:
determining a spatial domain basis vector and a frequency domain basis vector based on the at least one uplink channel information, and
determining angle information and delay information in the uplink channel state information based on the spatial domain basis vector and the frequency domain basis vector.

* * * * *